United States Patent Office 3,058,831
Patented Oct. 16, 1962

3,058,831
METHOD OF PRESERVATION OF DEHYDRATED FOOD
George J. Lorant, Albion, N.Y., assignor to General Foods Corporation, White Plains, N.Y., a corporation of Delaware
No Drawing. Filed Oct. 23, 1959, Ser. No. 848,182
5 Claims. (Cl. 99—192)

This invention relates to the preservation of foodstuffs intended to be stored in the dehydrated state and to processes for preparing the same.

The invention more particularly is concerned with preserving food products intended to be stored in a frozen dehydrated condition and subject to variations in storage temperatures to a greater or lesser degree at different times during the period of storage before they are prepared for consumption by rehydration with an aqueous liquid in the hands of the consumer.

It has long been recognized in the food processing art that foodstuffs containing reducing sugars and proteins are subject under conditions of moisture content of at least as high as 10 percent to what is known as a Maillard reaction. This reaction primarily involves a combination between the aldehyde portion of the reducing sugar and the free amino groups of the proteins present to form off-flavors and colors in many foods. Although the intensity of the reaction is a function of relative moisture content and temperature of the food material, it proceeds quite independently of the presence or absence of oxygen.

Quite distinct from the Maillard reaction a concurrent reaction of normal oxidative rancidity frequently takes place in the same sample of food. This reaction proceeds in a contrary fashion as respects the relative moisture content of the material, the higher the moisture level the slower the rate of reaction until at a moisture content of 20 percent, for example, the oxidation reaction is substantially non-existent. Unfortunately, at this moisture level the Maillard and bacterial reactions are proceeding at their highest peak and fastest rate of reaction. There therefore arises a problem of stabilizing and preserving the flavor of a low moisture food product by arresting the one deleterious reaction without promoting the other reaction. For an instance in a sample of a a puree containing a high proportion of reducing sugar or food acids and having a moisture content of the order of 20 percent, the oxidative deterioration due to oxygenic effects exerted on the sugars and proteins is relatively weak and upon storage creates no serious problems of preservation of the natural flavor or texture of the foodstuff. Yet, at such a high level of moisture content the proteins and reducing sugars are reacting strongly under the promotion of the hydrous environment to yield after a period of time in storage a food product which exhibits foreign flavor due to the formation of carbohydrate-protein complexes which yield an off-flavor and color.

The Maillard reaction, or browning reaction as it is also known, contributes to desirable as well as undesirable flavor development in various processed foods and phases of the food industry. For instance, the reaction contributes to the aroma, flavor and color of foods, such as ready-to-serve cereals, malted barley, and is chiefly responsible for the maple flavor developed in boiling the sap of the maple tree. It has also been observed and reported that the odor and flavor developed were characteristic of the amino acid involved. Thus glycine, for example, plus glucose reacted together yields a product having a flavor similar to that of stale beer.

The undesirable effects of the Maillard reaction have been recognized in the sugar, beer and malting industries. Many food products such as milk, eggs, fruit, fruit juices, meat, fish and vegetables have exhibited untoward flavor characteristic because of this phenomena. Off-odors, flavors and colors develop in these foods which are of varying degrees of intensity depending upon the degree to which the reaction has progressed. Under differing environmental conditions the off-flavor may be mild or very bitter. The color produced may vary from light cream to almost black depending upon reaction conditions and conditions of storage.

The Maillard reaction differs somewhat with the relative amounts of reacting sugars and proteins. Egg whites with high protein and low reducing sugar content will react slower than fruit purees and fuit juices which exhibit a low protein, high sugar and acid content. During the early part of the reaction the free amino content falls and the ratio of disappearance of free amino groups to glucose bound is practically 1:1. The reaction at this point when conducted at room temperature is slow and to some extent reversible. As time progresses or if subjected to heating more complex reactions of little understood mechanism occur, a characteristic brownish color appears and the product becomes insoluble over a wide pH range. The foregoing appears to be due to the reduction in free glucose units which are bound up by the free amino groups.

It has been recognized that the aldopentoses have a greater reactivity than do the di, tri, or poly saccharides, particularly at temperatures approximating that of normal room temperature. Those sugars having free aldehyde groups such as xylose and arabinose being 40 and 20 times, respectively, as reactive as glucose. It has also been known that as the pH, reaction temperature, and moisture content of the food solid increases the rate of reaction also increases.

Previously it has been proposed to inhibit the Maillard reaction by packing in a reducing gas such as $SO_2$ since other inert gases such as $CO_2$ and nitrogen do not appear to satisfactorily inhibit the reaction as they do inhibit oxidation. However, the cost of packing the food products in such inert atmosphere is both costly, tedious, and time consuming and in the case of $SO_2$ presents a health hazard to the processing plant operators as witnessed by government restrictions on the use of $SO_2$ as an inerting atmosphere.

It is an object of the present invention, therefore, to provide a method of preservation of food products subject to simultaneous Maillard reaction and oxidative deterioration.

It is a further object to provide a method of preserving frozen foods, particularly dehydrated frozen foods, subject to variant refrigeration conditions from deleterious reactions.

It is a further object of the present invention to provide a method of preserving of foodstuffs which avoids the use of costly inerting atmospheres and chemical stabilizing agents.

It would be very desirable to have available a method which would enable one to preserve in the frozen state a dehydrated free flowing powder of carrots, for example, asparagus, or other dried food product so that the final product would be relatively immune so as to speak from variations in storage conditions which promote either or both Maillard and oxidative reactions when the product is rewarmed.

A process has now been discovered whereby food products particularly in the dried and frozen state susceptible to Maillard and oxidative deterioration may be stabilized thereagainst without the use of costly and inerting atmosphere. In accordance with the present invention, for example, a slurry of food solids of the type disclosed herein has its moisture content reduced by causing the slurry to be rapidly concentrated while in contact with a heat exchange surface, typically a drum drier wherefrom the concentrated film or curtain of product is removed at a moisture content usually less than 10%.

Upon such removal the thin film or curtain of product is readjusted in its moisture content upwardly to a level not exceeding 20% by weight of the product which readjustment may be carried out by means to be more fully described hereinafter, but preferably involving the addition of a "snow" which is blended with the product under conditions wherein the moisutre content thereof readjusts upwardly. The present invention is founded on the discovery that, when this food product has been initially reduced to the aforestated moisture content and then readjusted in its moisture level, the goods are stabilized against rancidity or other deterioration when the temperature of the product is maintained below 40° F.; and preferably when the product moisture and material stabilized are maintained in a frozen state. This treatment has proven to be particularly adapted to preservation of dehydrated purees in flake form which are to be stored for protracted periods in freezer storage.

The explanation for this phenomenal stabilization is difficult and the contributing factors somewhat obscure, but it would appear that when the foodstuff rapidly is reduced initially to a moisture content below 10% while in the form of a thin film and is thereafter rehydrated to a moisture level above 10% that physical and/or chemical conditions are established whereby the product is stabilized at the customary frozen food stores temperatures of below 32° F. This finding is somewhat unexpected. For although the Maillard reaction is strongly suppressed by depression of the storage temperature to 0° F. regardless of the moisture content of the foodstuff, it has now been found that if the foodstuff is kept at the storage temperature normally at 32° F. and below, then the presence of 10–20 percent moisture enables one to control oxidative reactions as well as prevent Maillard reactions.

*Example 1*

As an illustration of the present process, the following example is set forth. A vegetable-meat mixture consisting of carrots, potatoes, raw beef, tomato paste, celery, oat flour, salt and onion powder is kettle cooked in sufficient water for 18 minutes to render it a soft particulate mass. After cooling to room temperature, the cooked product is pureed by means of a Fitzpatrick mill which consists of a large circular vat-like metal container possessing central agitating paddles and a peripheral wire mesh through which the food is passed to be pureed.

The feed to the apparatus of material to be dried will be in a liquid phase commonly known as slurry and it may be delivered to the outside of a heated double drum drier by positioning a drum so that a portion thereof is immersed in a pool of liquid or by passing the liquid over appropriate spreading devices onto the drum surfaces.

Typically, the puree product is concentrated and dried atmospherically on a double drum drier comprising a pair of rotating heated 24 inch diameter drums exhibiting a drum clearance of .010 inch and a drum speed of 1 revolution in 40 seconds. The steam pressure in the drum is 20 p.s.i.g. The sheet thickness of the product coming off the surface of the drum ranges between 6 to 10 ten thousandths of an inch and the rate of removal of dried sheet product is approximately 0.70 pound per hour per square foot.

When employing such a double drum drier the slurry of product may be delivered by an appropriate conduit to a pool of liquid maintained between the drums. As the drums rotate a portion of the liquid passes through the pinch between the drums and forms a thin film on the surface thereof of the order of 0.010 inch thickness.

This film is dried as the drum surface is heated by the steam passing within the drum. The moisture content is thus lowered to the range of 19–15 percent coming off the drum surface from an initial moisture content of 65–70 percent in the slurry prior to drum drying.

In general, the moisture content of the film removed by the doctor blade or other suitable means due to further evaporation will be less than 8 percent and higher than 2 percent by weight of the film and is preferably controlled to between 6–8 percent moisture.

The partially dehydrated product is then flaked through a 10 mesh, .027 inch wire screen and frozen to 0° F. Snow or ice crystals which have been screened to eliminate lumps are then added and blended into the mass. The amount of fine ice crystals is calculated to raise the moisture content of the dehydrated flake to about 15 percent, by transferring moisture by sublimation to it, but in no instance above 20 percent. For example, to 100 pounds of dried vegetable beef product at 7 percent moisture content and a temperature of 0° F., 9.4 pounds of "snow" was added by blending to yield a product exhibiting a moisture content of 15 percent.

The above mentioned product upon storage exhibited an unexpected freedom from deterioration of either an oxygenic or Maillard nature for at least 6 months upon storage in a refrigerated environment, wherein the temperature fluctuated above 0° C. to as high as 10° C. for periods as long as one hour.

*Example 2*

A batch of fresh carrots is peeled, trimmed, and cut into ⅜ and ¾ inch dices. The dices are then kettle cooked in sufficient water for a period of 9–12 minutes to enable preparation in a soft mass. After cooling to room temperature the carrot particles are placed in a circular pot type mill of conventional design having an interior peripheral screen and centrally activated rotating paddles which when rotating rapidly force the soft diced carrots through the screen to effect a straining action and form a puree. The puree slurry formed is then placed on the heated surfaces of a rotating 24 inch diameter double drum drier having a steam pressure of 15 p.s.i.g., a drum speed of 1 r.p.m. and a drum clearance of .010 inch. The material is heated to partially dehydrate the puree to a moisture content ranging from 6 to 10 percent by passage over the heated surface of the drum. The partially dried puree which still remains in a plastic state is removed by a tangentially positioned doctor blade at a rate of 0.392 pound per square foot per hour.

The dried carrot puree is then flaked through a 10 mesh wire screen and passed through a refrigerated chamber to be frozen at temperatures ranging from 0° to 10° F. Ice crystals which have been screened to eliminate lumps are then added to the frozen product by blending the product under freezing conditions. The amount of ice crystals added is carefully calculated to raise the moisture content of the blended product to 15 percent. This moisture which has been added back to the product is absorbed when the temperature is permitted to be elevated to just above freezing for a sufficient period of time to enable the moisture to be absorbed by the dehydrated flaked material (although by sublimation the moisture can be transferred to the dried flake). The moisture which has been absorbed is not merely on the surface of the particles but is internally absorbed in the dried flake. The temperature is again depressed to below the freezing point and the product stored at this temperature free of any oxidative or Maillard reaction deterioration.

*Example 3*

As another illustration of the manner in which applicants may exercise their present finding, the following example is presented. A batch of fresh carrots is prepared by dicing into ⅜ inch dices. These dices are then kettle cooked for a period of about 15 minutes and subsequently strained to form a puree in the manner indicated in the preceding example. The moisture content of the pureed carrots was 60–65 percent. The slurry of carrot material was passed over the surface of a double drum drier and heated to dehydrate the puree to a moisture content of 6 percent. The partially dried puree was then removed by a tangentially positioned doctor blade, flaked through a 10 mesh wire screen, remoistened to 16 percent and passed through a refrigerated chamber to be frozen at temperatures ranging from 0° to 10° F. This product, stored from six months to a year under fluctuating conditions of temperature, was found to resist oxidation and Maillard reaction extremely well.

While the remoistening of the puree has been illustrated in the above examples as being achieved by the addition of ice crystals, such method, although preferred, is not intended to limit the scope of the present invention. It is also within the contemplation of the instant process to raise the moisture content of the dried flaked material by contacting the same with a fine mist or spray of water in a revolving drum while the dried flakes are agitated at a temperature just above freezing or at about 33° F. and rapidly depressing the remoistened product below the freezing point of the product once the desired oxidation arresting content of water has been introduced.

For ease of reference the materials to be processed in the manner of this invention will be referred to as "purees" and should be understood to encompass soup stocks, puddings and other dried products which contain proteins and either reducing sugars or organic acids such as citric, ascorbic, malic, fumaric, etc.

Although no particular drier temperature appears to be critical as respects the rate of dehydration of the purees slurry, a maximum temperature such as that at which the product will lose all its moisture and start to brown is the limit of dryer heat above which the drier may not be operated to preserve the quality of the product.

The freezing of the puree product of the present invention may be effected in a number of various ways. While the broad concept would involve merely chilling the dehydrated flakes and blending with ice or snow crystals in a cold room, such blending may be effected in blending apparatus of a continuous type. For example, such blending may be effected by passage of the dried product through a continuous screw conveyor wherein the ice crystals are conducted directly into the horizontal flights of the screw conveyor to be admixed with the dried flake food product. The temperature in the conveyor means in this circumstance is controlled by continuous passage of refrigerated air which maintains the temperature at the below freezing mark. The blend of food and ice crystals are then conveyed directly to packaging means and stored under refrigeration.

While the present process applies more preferably to the preservation of vegetables and meat products which have a low or non-existent content of pectins and other elastic materials, it may be desirable in many instances to increase the elastic limit of such materials by the addition of elasticity modifiers to the puree prior to its concentration to a viscous state. In this circumstance the process may be applied to the storage and preservation of stretched baby food of either fruity nature, vegetable nature, or a mixture of these two with meats. These elasticity modifiers as they are hereinto referred, are intended to include the commonly known thickening agents both natural and synthetic, such as starches, pectins, algin, Irish moss extract, gum arabic, gum acacia, cellulosic ethers and esters such as carboxymethyl cellulose, the sodium salt thereof or the hydroxy derivatives such as mono- or dihydroxy carboxy methyl cellulose, ethyl or methyl cellulose, methyl ethyl cellulose, hydroxy propyl methyl cellulose and hydroxy ethyl cellulose.

The invention herein disclosed, while illustrating a means of preservation of pureed vegetables and composite dried products of animal and vegetable origin, is also quite advantageously adapted to fruit purees such as apricot, applesauce, cranberry, apple apricot, peaches, plums, strawberries and others having a tendency to be effected deleteriously by oxidative and Maillard reactions.

The examples set forth are intended to be merely representative of the inventive concept involved and many other materials not specifically enumerated may be processed in accord with the invention. The scope of the invention is not to be limited to the immediate examples set forth as illustrations but is rather to be determined by the recitation of the appended claims.

I claim:
1. In a process for the preservation of a dehydrated food puree which comprises causing a slurry of food solids to be concentrated to form thin chilled flakes thereof having a water content less than 10 percent which is in a frozen state, the improvement which comprises adding an amount of moisture to the flakes sufficient to cause their moisture content to be raised to above ten percent but not above 20 percent while maintaining them in their chilled state, and then storing the flakes with the moisture added thereto under refrigeration.

2. In a process for the preservation of a dehydrated food puree which comprises causing a slurry of food solids to be concentrated to form thin chilled flakes thereof having a water content less than ten percent which is in a frozen state, the improvement which comprises adding an amount of moisture in the form of snow to the flakes sufficient to cause their moisture content to be raised to above ten percent but not above 20 percent while maintaining them in their chilled state, and then storing the flakes with the moisture added thereto under refrigeration.

3. A process for the preservation of a dehydrated food puree which comprises causing a slurry of food solids to be concentrated to form a thin film thereof having a water content of less than 10 percent; chilling the film to freeze the moisture content thereof and breaking the chilled film into flakes; adding an amount of moisture to the flakes sufficient to cause their moisture content to be raised to above 10 percent but not above 20 percent while maintaining them in their chilled state; and then storing the flakes with the moisture added thereto under refrigeration.

4. A process according to claim 3 wherein the moisture content is added to the flakes in the form of snow uniformly distributed therethrough.

5. A process according to claim 4 wherein the slurry is dehydrated by drum drying.

References Cited in the file of this patent
UNITED STATES PATENTS

| | | |
|---|---|---|
| 2,491,495 | Hart et al. | Dec. 20, 1949 |
| 2,541,859 | Callaghan et al. | Feb. 13, 1951 |
| 2,768,900 | Vertner | Oct. 30, 1956 |
| 2,780,552 | Willard et al. | Feb. 5, 1957 |
| 2,844,476 | Rivoche | July 22, 1958 |
| 2,901,359 | Forkner | Aug. 25, 1959 |